United States Patent
Zhang (10) Patent No.: US 10,191,713 B2
(45) Date of Patent: Jan. 29, 2019

(54) INFORMATION PROCESSING METHOD AND ELECTRONIC DEVICE

(71) Applicant: Lenovo (Beijing) Co., Ltd., Beijing (CN)

(72) Inventor: Jinfeng Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 237 days.

(21) Appl. No.: 14/500,390

(22) Filed: Sep. 29, 2014

(65) Prior Publication Data

US 2015/0268919 A1   Sep. 24, 2015

(30) Foreign Application Priority Data

Mar. 24, 2014   (CN) .......................... 2014 1 0109933

(51) Int. Cl.
  *G06F 3/14*   (2006.01)
(52) U.S. Cl.
  CPC ... G06F 3/1454 (2013.01); *G09G 2340/0464* (2013.01)
(58) Field of Classification Search
  CPC ..................... G06F 3/1454; G09G 2340/0464
  See application file for complete search history.

(56) References Cited

U.S. PATENT DOCUMENTS 5,191,411 A * 3/1993 Muckerheide ............ A61F 4/00
                                                      348/211.99
5,612,736 A * 3/1997 Vogeley ................ G06F 3/0386
                                                      348/207.99

(Continued)

FOREIGN PATENT DOCUMENTS

CN   1622619        6/2005
CN   101754433 A    6/2010

(Continued)

OTHER PUBLICATIONS

First Office Action dated Jul. 5, 2017 (14 pages including English translation) out of Chinese priority Application No. 201410109933.4.

(Continued)

*Primary Examiner* — Nitin Patel
*Assistant Examiner* — Robert M Stone
(74) *Attorney, Agent, or Firm* — Brinks Gilson & Lione; John C. Freeman (57) ABSTRACT

An information transmitting method and an electronic device using the method are described. The method includes establishing a communication connection with an electronic device; projecting a to-be-transmitted object information into a display screen of the electronic device; transmitting the to-be-transmitted object information to the electronic device to make the electronic device display the to-be-transmitted object information in the display screen. The first electronic device includes a connecting unit, a projecting unit and a transmitting unit. The second electronic device includes a connecting unit, a receiving unit and a display unit. As a result, transmission of the to-be-transmitted object information between devices based on projection achieves a seamless operational experience combining an actual condition and a virtual condition, and the projecting mode is simple and convenient and intuitive and highly effective, which improves features of real-time and ease of use of the transmitted object.

12 Claims, 5 Drawing Sheets

(56) References Cited

U.S. PATENT DOCUMENTS

| | | | |
|---|---|---|---|
| 7,986,302 B2 * | 7/2011 | Horikiri | G06F 3/0386 345/156 |
| 2002/0089489 A1 * | 7/2002 | Carpenter | G06F 3/0386 345/158 |
| 2003/0224728 A1 * | 12/2003 | Heinonen | H04B 3/54 455/41.2 |
| 2004/0001043 A1 * | 1/2004 | Lin | G06F 3/0386 345/157 |
| 2004/0085522 A1 * | 5/2004 | Honig | G03B 21/26 353/121 |
| 2004/0141162 A1 * | 7/2004 | Olbrich | G06F 3/017 353/119 |
| 2004/0203363 A1 * | 10/2004 | Carlton | G06Q 30/02 455/41.2 |
| 2004/0239653 A1 * | 12/2004 | Stuerzlinger | G06F 3/038 345/183 |
| 2005/0250552 A1 * | 11/2005 | Eagle | H04M 1/7253 455/567 |
| 2007/0040800 A1 * | 2/2007 | Forlines | G06F 3/0325 345/158 |
| 2007/0242233 A1 * | 10/2007 | Sokeila | H04N 9/3185 353/69 |
| 2007/0257927 A1 * | 11/2007 | Sakanishi | G09G 5/005 345/581 |
| 2007/0294556 A1 * | 12/2007 | Wutka | G06F 3/038 713/324 |
| 2010/0070915 A1 | 3/2010 | Tsutsui | |
| 2012/0229428 A1 * | 9/2012 | Tavakoli | G06F 3/03545 345/179 |
| 2013/0103847 A1 * | 4/2013 | Brown | H04L 63/083 709/229 |
| 2013/0181953 A1 * | 7/2013 | Hinckley | G06F 3/0383 345/179 |
| 2013/0278629 A1 * | 10/2013 | Tan | G06F 3/1454 345/629 |
| 2014/0250245 A1 * | 9/2014 | Pahud | G06F 13/102 710/14 |

FOREIGN PATENT DOCUMENTS

| | | |
|---|---|---|
| CN | 102333215 | 1/2012 |
| CN | 103209244 | 7/2013 |
| CN | 103513947 | 1/2014 |
| EP | 2214097 | 8/2010 |

OTHER PUBLICATIONS

Second Office Action dated Mar. 13, 2018 (8 pages including English translation) from corresponding Chinese patent Application No. 201410109933.4.

* cited by examiner

INFORMATION PROCESSING METHOD AND ELECTRONIC DEVICE

This application claims priority to Chinese patent application No. 201410109933.4 filed on Mar. 24, 2014, the entire contents of which is incorporated herein by reference.

BACKGROUND

This disclosure relates to field of communication, and particularly relates to an information transmitting method and an electronic device using the method.

Kinds of electronic device are increasingly more, for example, a PC, a Pad and a mobile phone or the like, people always need to share data between these devices or complete a task by cooperation of a plurality of device. However, current manner of exchanging data between the plurality of devices are not very natural and direct.

A usual scheme of data sharing of the plurality of device is as follows: one device connects to another device as an external storage device, and then operates files in the external storage device by using an interface of a file system.

However, what a user sees in this manner is a file directory, which is not very intuitive; and, in procedure of operation, function of reading data of device as external storage is unavailable and can only be used at time of disconnecting, thus a feature of real-time is very poor.

SUMMARY

On that account, the embodiments provide an information transmitting method and an electronic device using the method to improve the feature of real-time and easy to use of transmitting object information between the devices. Technical solutions are as follows:

In a first aspect, there provides an information transmitting method including: establishing a communication connection with an electronic device; projecting to-be-transmitted object information into a display screen of the electronic device; and transmitting the to-be-transmitted object information to the electronic device to make the electronic device display the to-be-transmitted object information in the display screen.

In a second aspect, there provides a first electronic device including: a connection unit for establishing a communication connection with a second electronic device; a projecting unit for projecting to-be-transmitted object information into a display screen of the second electronic device; and a transmitting unit for transmitting the to-be-transmitted object information to the second electronic device to make the second electronic device display the to-be-transmitted object information in the display screen In a third aspect, there provides a first electronic device including: a connecting unit for establishing a communication connection with a second electronic device; a receiving unit for receiving to-be-transmitted object information transmitted by the second electronic device; and a display unit for displaying the to-be-transmitted object information in a specified region on a local display screen, the specified region being a region on the local display screen to which the second electronic device projects the to-be-transmitted object information through a projecting unit.

BRIEF DESCRIPTION OF THE DRAWINGS

In order to explain technical solution in the embodiments more clear, the accompanying drawings that needs to be used in the description of the embodiments are described simply, it is obvious that the accompanying drawings in the following description are only some embodiments of this disclosure, and for those skilled in the art, other accompanying drawings can be obtained according to these accompanying drawings without inventive labor.

DETAILED DESCRIPTION

In order to make purpose, technical solutions and advantages of this disclosure more clear, implementation modes of this disclosure is further described detailed in combination with the accompanying drawings hereinafter.

The First Embodiment

Figure 1:
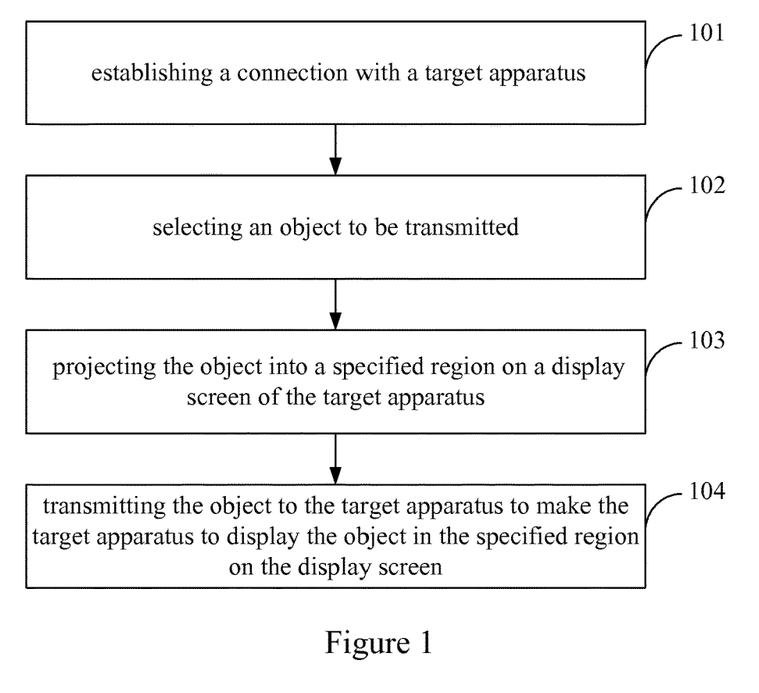
FIG. 1 is a flow chart of the information transmitting method provided by the first embodiment.

With reference to FIG. 1, the present embodiment provides an information transmitting method including:

101: establishing a connection with a target device;

The connection may be a wired connection or a wireless connection, manner of the wireless connection includes, but not limited to Wi-Fi, Blue-tooth or infrared or the like. The target device is an electronic device having a display screen, which includes, but not limited to a computer, a notebook computer, a tablet computer, a mobile phone or the like, the present embodiment does not make any specific restriction thereto.

102: selecting an object to be transmitted;

The object to be transmitted may be visual element of any type, which includes, but not limited to a file, an icon or a picture or the like.

103: projecting to-be-transmitted object information into a specified region on the display screen of the target device;

The specified region is set by a user according to need, and it may be any one region on the display screen of the target device. In the present embodiment, when the source device projects the to-be-transmitted object information onto the display screen of the target device, a distance and an angle of the projection are not limited, the user may adjust a distance from the source device to the target device according to need, and may also adjust the angle of the projection by rotating the source device, and so on, as long as ensuring the to-be-transmitted object information to be transmitted to be projected on the display screen of the target device correctly. Of course, size and angle of a projected picture may also be adjusted until the user satisfies and then the to-be-transmitted object information is transmitted by executing a trigger, and the present embodiment does not make any specific restriction thereto.

104: transmitting the to-be-transmitted object information to the target device to make the target device display the to-be-transmitted object information in the specified region on the display screen.

Wherein, an operation of transmitting the to-be-transmitted object information may be triggered automatically immediately after the projection, or may also be triggered automatically a certain after the projection, or may also be triggered after the user presses a button, and so on, the present embodiment does not make any specific restriction thereto.

The above-described method provided by the present embodiment may be executed by the source device having a projecting function, the source device includes, but not limited to a mobile phone, a computer, a notebook computer, a tablet computer or the like, and the present embodiment does not make any specific restriction thereto.

Wherein, the source device and the target device both are electronic devices, and can also be named as first electronic device and second electronic device Further, in the present embodiment, after the target device displays the to-be-transmitted object information in the specified region, the source device would stop projecting the to-be-transmitted object information, so as to make the user watch content displayed actually on the target device but not content projected by the source device.

In the present embodiment, step 104 may include:

Acquiring a projection display parameter of the to-be-transmitted object information and collecting a display effect on the display screen of the target device;

Transmitting the to-be-transmitted object information, the projection display parameter of the to-be-transmitted object information and display effect to the target device, to make the target device display the to-be-transmitted object information with the display effect in the specified region on the display screen according to the projection display parameter.

Further, in the above step, acquiring the projection display parameter of the to-be-transmitted object information may include:

Acquiring a screenshot of a projection picture of the to-be-transmitted object information as the projection display parameter of the to-be-transmitted object information.

Wherein, projecting the to-be-transmitted object information into the specified region on the display screen of the target device may include:

Adjusting size of the to-be-transmitted object information on a local display screen according to a local operation instruction;

Projecting an to-be-transmitted object information displayed on the local display screen after adjusting the size into the specified region on the display screen of the target device;

Correspondingly, acquiring the projection display parameter of the to-be-transmitted object information may include:

Acquiring a screenshot of a projection picture of to-be-transmitted object information displayed on the local display screen after adjusting the size as the projection display parameter of the to-be-transmitted object information.

In the present embodiment, collecting the display effect on the display screen of the target device may include:

Intercepting a picture of the display screen of the target device to obtain the display effect on the display screen of the target device.

In the present embodiment, establishing the connection with the target device may include:

Collect information of the target device;

Searching correspondence relationship between the information of the target device and address established in advance to obtain an address corresponding to the information of the target device collected;

Establishing the connection with the target device according to the address.

Further, collecting the information of the target device may include:

Collecting a picture of the target device or scanning a two-dimensional code on the target device.

The target device may be a device having a projecting function and easy to move, and the target device may be a device which is larger than the source device and does not move generally. For example, the source device is the mobile phone, the target device is the PC; or, the source device is the iPad, the target device is the PC; or, the source device is the mobile phone, the target device is the notebook computer, and so on. The source device is easy to move to be convenient to adjust the projecting effect in procedure of projection, so as to achieve a satisfactory projecting effect. Hereinafter, it is described detailed by example.

For example, in one scene, the source device is the mobile phone having the projecting function, and the target device is the PC. The user may select a photo on the mobile phone, of course may also be other pictures or the like, and then project the photo onto the display screen of the PC. In the procedure of projection, the user may move the mobile phone at will to adjust the distance of the mobile phone to the display screen of the PC or angle of rotation of the mobile phone or the like, to achieve the satisfactory projecting effect. The photo, a screenshot of a projecting picture of the photo and a collected picture of the display screen of the PC are triggered to be transmitted after determining the projection. After receiving the pictures, the PC collects a picture of a local display screen and corrects the received picture according to the picture of the local display screen, calculates a display parameter according to the photo and the screenshot of the projection picture, and displays the photo on the display screen according to the display parameter and the corrected picture at last, so as to obtain a display effect being same as the projection. Of course, the computer in this scene may also be replaced with the notebook computer or the tablet computer or the like.

In the above-described method provided by the present embodiment, by establishing the connection with the target device, selecting the object to be transmitted, projecting the to-be-transmitted object information in the specified region on the display screen of the target device, transmitting the to-be-transmitted object information to the target device to make the target device display the to-be-transmitted object information in the specified region on the display screen, the transmission of the to-be-transmitted object information between device are implemented based on the projection, which achieves the seamless operational experience combining the actual condition and the virtual condition, and the manner of projection is simple and convenient and intuitive and high effective, which improves the features of real-time and easy to use of transmitting the object.

The Second Embodiment

Figure 2:
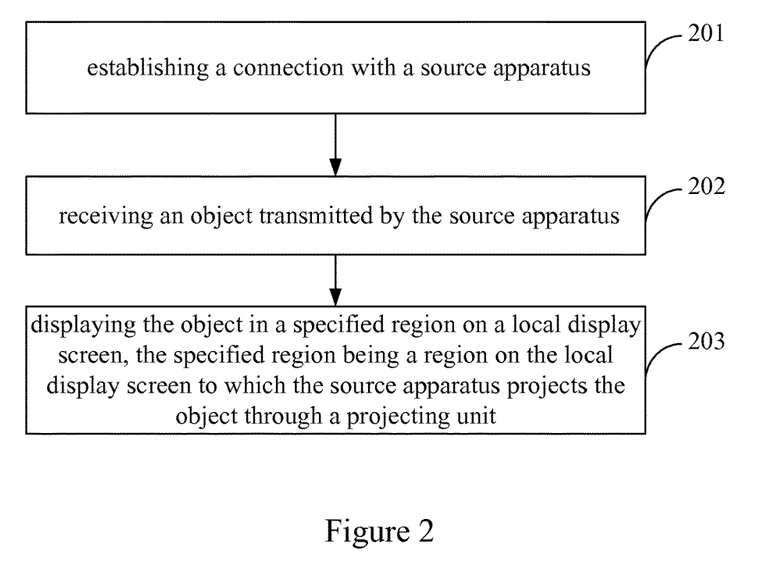
FIG. 2 is a flow chart of the information transmitting method provided by the second embodiment.

With reference to FIG. 2, the present embodiment provides an information transmitting method including:

201: establishing a connection with a source device;

Wherein, the source device has a projecting function, which is able to project to-be-transmitted object information onto a display screen of a local device.

202: receiving to-be-transmitted object information transmitted by the source device;

203: displaying the to-be-transmitted object information in a specified region on a local display screen, the specified region being a region on the local display screen to which the source device projects the to-be-transmitted object information through a projecting unit.

The above-described method provided by the present embodiment may be executed by a target device having a display screen, the target device includes, but not limited to a mobile phone, a computer, a notebook computer, a tablet computer or the like, and the present embodiment does not make any specific restriction thereto.

Wherein, receiving the to-be-transmitted object information transmitted by the source device and displaying the to-be-transmitted object information in the specified region on the local display screen may include:

Receiving the to-be-transmitted object information transmitted by the source device, a projection display parameter of the to-be-transmitted object information and a display effect, the display effect being obtained by collecting after the source device projects the to-be-transmitted object information to the specified region on the local display screen;

Collecting a current display effect of the local display screen, and correcting the received display effect according to the current display effect of the local display screen;

Displaying the to-be-transmitted object information in the specified region on the local display screen according to the corrected display effect and the projection display parameter of the to-be-transmitted object information.

Further, in the above step, collecting the current display effect of the local display screen may include:

Intercepting a picture displayed currently on the local display screen to obtain the current display effect of the local display screen.

In the present embodiment, correcting the received display effect according to the current display effect of the local display screen may include:

Comparing parts of same content in the current display effect of the local display screen and the received display effect;

Calculating a correcting parameter of the part of the same content from the received display effect to the current display effect of the local display screen;

Correcting the received display effect according to the correction parameter.

In the above present embodiment, the above projection display parameter of the to-be-transmitted object information may include a screenshot of a projection picture of the to-be-transmitted object information, and correspondingly, displaying the to-be-transmitted object information in the specified region on the local display screen according to the corrected display effect and the projection display parameter of the to-be-transmitted object information may include:

Calculating to obtain size and angle corresponding to the to-be-transmitted object information according to the screenshot of the projection picture of the to-be-transmitted object information;

Displaying the to-be-transmitted object information into the specified region on the local display screen according to the size and the angle of the to-be-transmitted object information calculated to be obtained with the corrected display effect as target.

In the present embodiment, the target device may be a device having a projecting function and easy to move, and the source device may be a device which is larger than the target device and does not move generally. For example the source device is a projector, the target device is the mobile phone; or, the source device is a projector, the target device is an iPad or the like. The target device is easy to move so that a satisfactory projecting effect is achieved by moving the target device in the procedure of projection. Hereinafter, it is described detailed by example.

For example, in one scene, the source device is the projector and the target device is the mobile phone. The user may select one photo on the projector, and then projects the photo onto the display screen of the mobile phone. In the procedure of projection, the user can move the mobile phone at will to determine that the photo projected onto the display screen of the mobile phone achieves a satisfactory effect. The photo, a screenshot of a projecting picture of the photo and a collected picture of the display screen of the mobile phone are triggered to be transmitted after determining the projection. After receiving the photo, the mobile phone collects a picture of a local display screen and corrects the received photo according to the picture of the local display screen, calculates a display parameter according to the received photo and the screenshot of the projection picture, and displays the received photo on the display screen according to the display parameter and the corrected photo at last, so as to obtain a display effect being same as the projection.

In the above-described method provided by the present embodiment, by establishing the connection with the source device, receiving the to-be-transmitted object information transmitted by the source device, displaying the to-be-transmitted object information in the specified region on the local display screen, the specified region being the region on the local display screen to which the source device projects the to-be-transmitted object information through the projecting unit, the transmission of the to-be-transmitted object information between device are implemented based on the projection, which achieves the seamless operational experience combining the actual condition and the virtual condition, and the manner of projection is simple and convenient and intuitive and high effective, which improves the features of real-time and easy to use of transmitting the object.

The Third Embodiment

Figure 3:
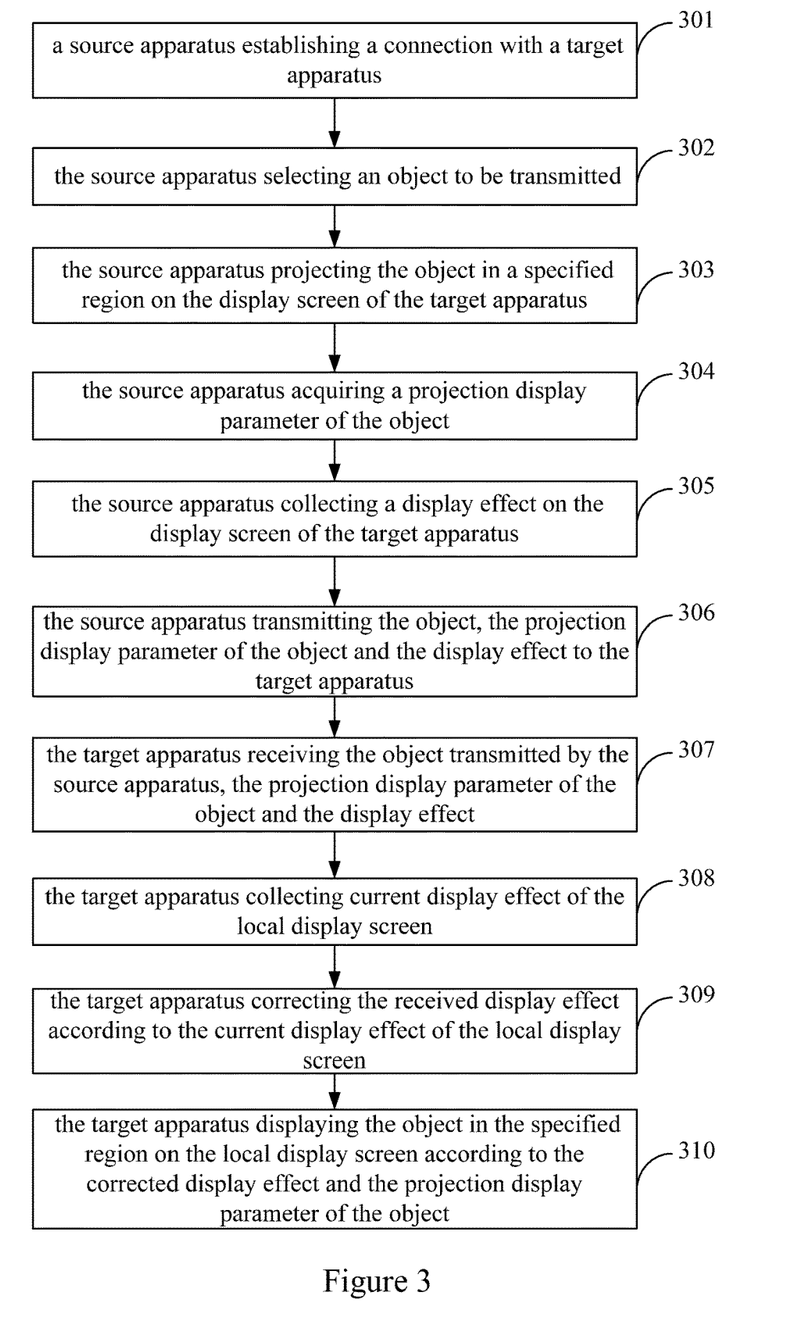
FIG. 3 is a flow chart of the information transmitting method provided by the third embodiment.

With reference to FIG. 3, the present embodiment provides an information transmitting method including:

301: the source device establishing a connection with a target device;

This step may include the following steps:

The source device collecting information of the target device;

The source device searching correspondence relationship between the information of the target device and address established in advance to obtain an address corresponding to the information of the target device collected;

The source device establishing the connection with the target device according to the address.

Wherein, the information of the target device refers to information that may recognize a certain device as the target device, which includes, but not limited to: a picture of the target device or a two-dimensional code of the target device or the like. Further, the source device collecting the information of the target device may include:

Collecting a picture of the target device or scanning a two-dimensional code on the target device.

The address of the target device may be an IP address of the target device or the like.

302: the source device selecting an object to be transmitted;

303: the source device projecting the to-be-transmitted object information in a specified region on the display screen of the target device;

304: the source device acquiring a projection display parameter of the to-be-transmitted object information;

In particular, it may include:

Acquiring a screenshot of a projection picture of the to-be-transmitted object information as the projection display parameter of the to-be-transmitted object information.

Wherein, the screenshot of the projection picture can reflect an effect of the to-be-transmitted object information at the time of projecting, and information such as size and angle of rotation or the like of the to-be-transmitted object information at the time of projecting can be obtained by analyzing the screenshot of the projection picture.

305: the source device collecting a display effect on the display screen of the target device;

In particular, it may include:

Intercepting a picture of the display screen of the target device to obtain the display effect on the display screen of the target device.

Wherein, since there is already content projected by an active device on the display screen of the target device, therefore, in intercepting the picture of the display screen of the target device in this step, not only original display content on the display screen of the target device is included, but also content projected by the source device is included. For example, 10 icons are displayed on the display screen of the target device originally, and the source device projects to display a new icon on the display screen of the target device, and 11 icons are included in the picture of the display screen of the target device intercepted at this time.

306: the source device transmitting the to-be-transmitted object information, the projection display parameter of the to-be-transmitted object information and the display effect to the target device;

307: the target device receiving the to-be-transmitted object information transmitted by the source device, the projection display parameter of the to-be-transmitted object information and the display effect;

308: the target device collecting current display effect of the local display screen;

Wherein, the current display effect of the display screen of the target device only includes content that the target device is able to display, but the to-be-transmitted object information projected on the display screen of the target device by the source device is not included therein.

In particular, it may include:

The target device intercepting a picture displayed currently on the local display screen to obtain the current display effect of the local display screen.

309: the target device correcting the received display effect according to the current display effect of the local display screen;

Wherein, the display effect transmitted by the source device may have a certain error due to factors such as position, angle of the source device, for example, have a certain angle of tilt, therefore, the received display effect needs to be corrected to exclude the error and improve resultant accuracy.

In particular, this step may include:

The target device compares parts of same content in the current display effect of the local display screen and the received display effect;

Calculating a correcting parameter of the part of the same content from the received display effect to the current display effect of the local display screen;

Correcting the received display effect according to the correction parameter.

Figure 4:
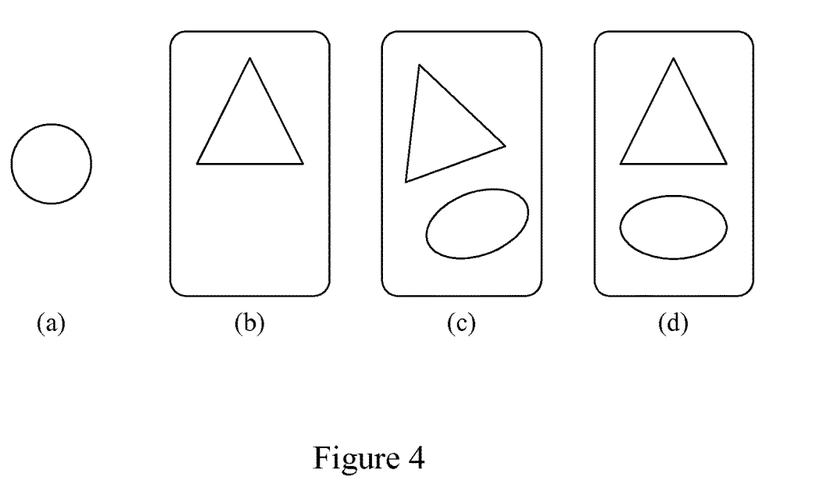
FIG. 4 is a schematic diagram of correcting the display effect provided by the third embodiment.

For example, with reference to FIG. 4, it is a schematic diagram of correcting the display effect. Wherein, figure (a) is an object to be transmitted in the source device, and it is a circular shape. Figure (b) is the current display effect of the display screen of the target device, it can be seen that the target device displays a triangular shape currently. Figure (c) is the collected display effect of the display screen of the target device after the source device projecting the to-be-transmitted object information to be transmitted on the display screen of the target device, and it can be seen that the display effect has a certain rotation error due to a certain tilt at the time of collecting the picture of the display effect by the source device. Therefore, the target device may compare same content in the received display effect in figure (c) and the display effect obtained by collecting locally in figure (b), that is, compare the triangular shape therein to obtain a correction parameter from the triangular shape in figure (c) to the triangular shape in figure (b), for example, rotating by 30° clockwise, and then the received display effect in figure (c) is corrected with the correction parameter, so as to obtain the corrected display effect shown in figure (d).

310: the target device displaying the to-be-transmitted object information in the specified region on the local display screen according to the corrected display effect and the projection display parameter of the to-be-transmitted object information.

Wherein, the projection display parameter of the to-be-transmitted object information may include the screenshot of the projection picture of the to-be-transmitted object information, correspondingly, this step may include:

Calculating to obtain size and angle corresponding to the to-be-transmitted object information according to the screenshot of the projection picture of the to-be-transmitted object information;

Displaying the to-be-transmitted object information into the specified region on the local display screen according to the size and the angle of the to-be-transmitted object information calculated to be obtained with the corrected display effect as target.

Figure 5:
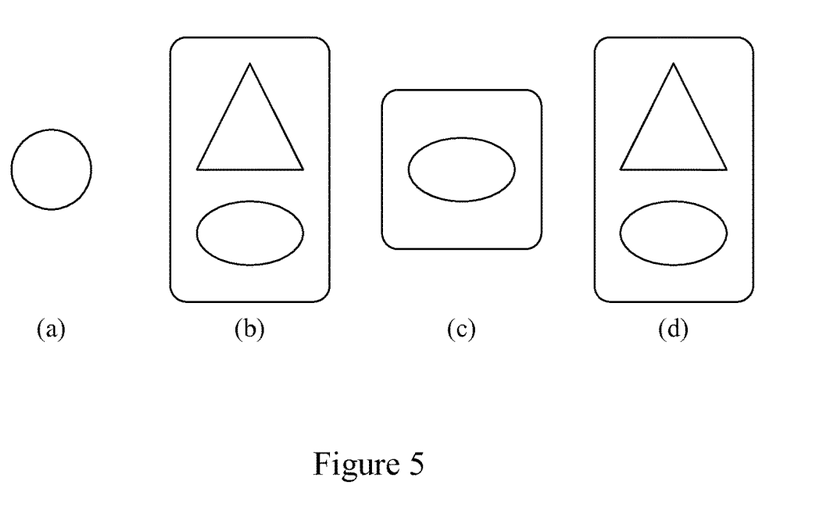
FIG. 5 is a schematic diagram of a display object provided by the third embodiment.

For example, with reference to FIG. 5, it is a schematic diagram of displaying the to-be-transmitted object information according to the display effect and the projection display parameter. Wherein, figure (a) is an object received by the target device, and it is a circular shape. Figure (b) is the display effect obtained after correcting by the target device, which includes a triangular shape and an ellipse shape. Figure (c) is the screenshot of the projection picture collected by the source device and received by the target device, and it can be seen that the circular shape of the object is projected after being adjusted to the ellipse shape. Therefore, the target device may calculate the size and the angle of the object to be displayed according to the ellipse shape in figure (c) and the circular shape in figure (a), for example, reducing to 90% of original size of the object, or rotating by 5° counter-clockwise, and so on. Then, the target device displays the to-be-transmitted object information into the specified region according to the calculated size and angle of the object with the corrected display effect in figure (b) as target, so as to obtain the display effect in figure (d) on the display screen. It can be seen that, an effect displayed on the display screen of the target device in figure (d) is same as a corrected effect of the display effect on the display screen of the target device collected by the source device, so that the user is able to sense the projection intuitively, that is, obtain a same displayed effect.

In the present embodiment, the source device and the target device may be device of same kind, or may also be devices of different kinds, and the present embodiment does not make any specific restriction thereto.

In the above-described method provided by the present embodiment, projecting the to-be-transmitted object information into the specified region on the display screen of the target device may include: adjusting the size of the object on the local display screen according to local operation instruction; projecting the to-be-transmitted object information displayed on the local display screen after adjusting the size into the specified region on the display screen of the target device;

Correspondingly, acquiring the projection display parameter of the to-be-transmitted object information may include: acquiring the screenshot of the projection picture of the to-be-transmitted object information displayed on the local display screen after adjusting the size as the projection display parameter of the to-be-transmitted object information.

In the above-described method provided by the present embodiment, by the source device establishing the connection with the target device, the source device selecting the object to be transmitted, projecting the to-be-transmitted object information in the specified region on the display screen of the target device, transmitting the to-be-transmitted object information, the projection display parameter of the to-be-transmitted object information and the display effect to the target device, the target device correcting the received display effect according to the current display effect of the local display screen after receiving the display effect, displaying the to-be-transmitted object information in the specified region on the local display screen according to the corrected display effect and the projection display parameter of the to-be-transmitted object information, so as to implement the transmission of the to-be-transmitted object information between device based on the projection, which achieves the seamless operational experience combining the actual condition and the virtual condition, and the manner of projection is simple and convenient and intuitive and high effective, which improves the features of real-time and easy to use of transmitting the object.

The Fourth Embodiment

Figure 6:
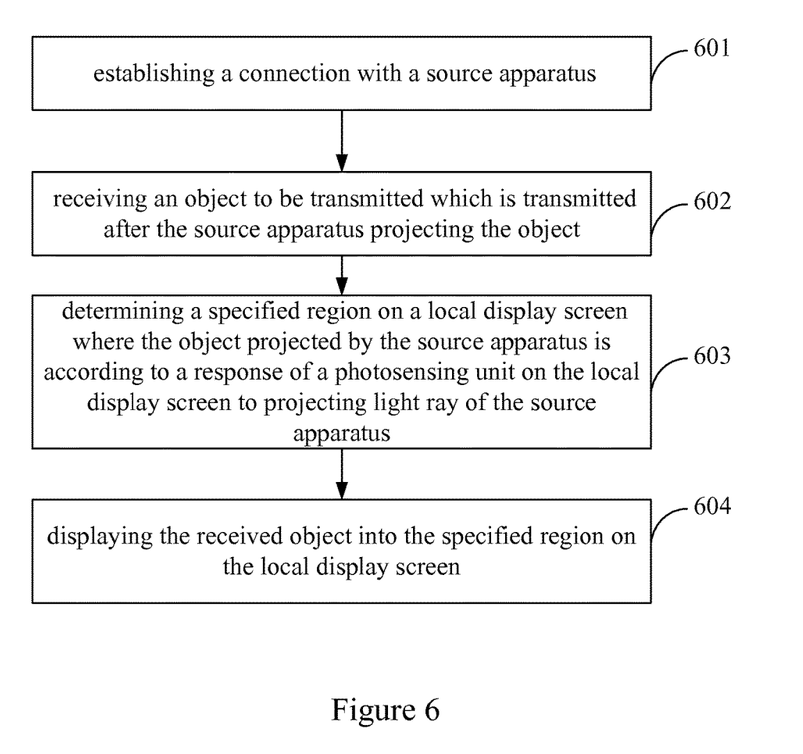
FIG. 6 is a flow chart of the information transmitting method provided by the fourth embodiment.

With reference to FIG. 6, the present embodiment provides an information transmitting method including:

601: establishing a connection with a source device;

602: receiving to-be-transmitted object information which is transmitted after the source device projecting the to-be-transmitted object information;

603: determining a specified region on a local display screen where the to-be-transmitted object information projected by the source device is according to a response of a photosensing unit on the local display screen to projecting light ray of the source device;

604: displaying the received to-be-transmitted object information into the specified region on the local display screen.

The above-described method provided by the present embodiment may be executed by the target device. The photosensing unit is on the display screen of the target device and is able to sense the projecting light ray of the source device, so as to know position where the projected object is and the size of the projected object, and in turn determine the specified region where the projected object is.

For example, the source device is a mobile phone having a projecting function, the target device is an electronic device, and the photosensing unit is on the display screen thereof. The user selects a file in the mobile phone, for example, a picture including text content or the like, and projects the file onto the display screen of the electronic device and transmits the file to the electronic device. The photosensing unit on the display screen of the electronic device determines the specified region where the projected file is through light ray sensing, so as to display the received file in the specified region. This manner can be applied in a scene in which the user of the mobile phone leaves word electronically and content of the word left is displayed on the display screen of the electronic device by projection finally, so as to facilitate others to view, and operation is simple and convenient and fast.

In the above-described method provided by the present embodiment, by establishing the connection with the source device, receiving the object to be transmitted which is transmitted after being projected by the source device, determining the specified region on the local display screen where the object projected by the source device is according to response of the photosensing unit on the local display screen to the projecting light ray of the source device, and displaying the received to-be-transmitted object information into the specified region on the local display screen, the transmission of the to-be-transmitted object information between device are implemented based on the projection, which achieves the seamless operational experience combining the actual condition and the virtual condition, and the manner of projection is simple and convenient and intuitive and high effective, which improves the features of real-time and easy to use of transmitting the object.

The Fifth Embodiment

Figure 7:
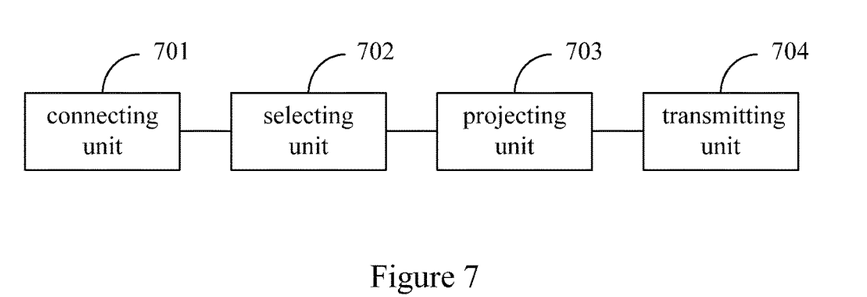
FIG. 7 is a structural diagram of the source device provided by the fifth embodiment.

With reference to FIG. 7, the present embodiment provides a source device including:

A connection unit 701 for establishing a connection with a target device;

A selecting unit 702 for selecting an object to be transmitted;

A projecting unit 703 for projecting the to-be-transmitted object information into a specified region on a display screen of the target device;

A transmitting unit 704 for transmitting the to-be-transmitted object information to the target device to make the target device display the to-be-transmitted object information in the specified region on the display screen.

In the present embodiment, the transmitting unit 704 may include:

An acquiring module for acquiring a projection display parameter of the to-be-transmitted object information and collecting a display effect on the display screen of the target device;

A transmitting module for transmitting the to-be-transmitted object information, the projection display parameter of the to-be-transmitted object information and the display effect to the target device, to make the target device display the to-be-transmitted object information with the display effect in the specified region on the display screen according to the projection display parameter.

Further, the above-described acquiring module may for:

Acquiring a screenshot of a projection picture of the to-be-transmitted object information as the projection display parameter of the to-be-transmitted object information.

In the present embodiment, the projecting unit 703 may include:

An adjusting module for adjusting size of the object on a local display screen according to a local operation instruction;

A projecting module for projecting to-be-transmitted object information displayed on the local display screen after adjusting the size into the specified region on the display screen of the target device;

Correspondingly, the above-described acquiring module may for: acquiring the screenshot of the projection picture of the to-be-transmitted object information displayed on the local display screen after adjusting the size as the projection display parameter of the to-be-transmitted object information.

As an alternative implementation mode, the above-described acquiring module may for:

Intercepting a picture of the display screen of the target device to obtain the display effect on the display screen of the target device.

In the present embodiment, the connecting unit 701 may include:

A collecting module for collecting information of the target device;

A search module for searching correspondence relationship between the information of the target device and address established in advance to obtain an address corresponding to the information of the target device collected;

A connecting module for establishing a connection with the target device according to the address.

Further, the above-described collecting module may for:

Collecting a picture of the target device or scanning a two-dimensional code on the target device.

The above-described source device provided by the present embodiment may execute method provided in the above-described method embodiment, detailed procedure is as description in the method embodiment, and it is no longer described here.

In the above-described source device provided by the present embodiment, by establishing the connection with the target device, selecting the object to be transmitted, projecting the to-be-transmitted object information into the specified region on the display screen of the target device, transmitting the to-be-transmitted object information to the target device to make the target device display the to-be-transmitted object information in the specified region on the display screen, the transmission of the to-be-transmitted object information between device are implemented based on the projection, which achieves the seamless operational experience combining the actual condition and the virtual condition, and the manner of projection is simple and convenient and intuitive and high effective, which improves the features of real-time and easy to use of transmitting the object.

The Sixth Embodiment

Figure 8:
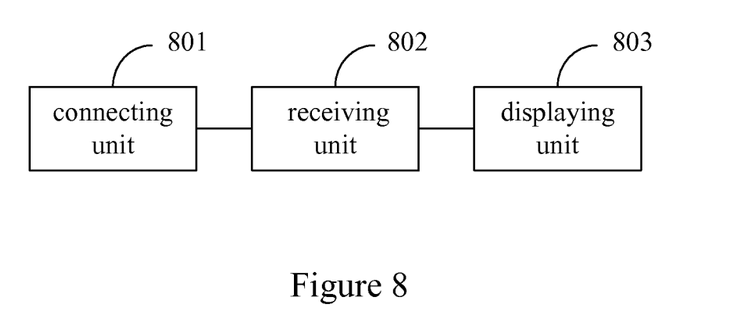
FIG. 8 is a structural diagram of the target device provided by the sixth embodiment.

With reference to FIG. 8, the present embodiment provides a target device including:

A connecting unit 801 for establishing a connection with a source device;

A receiving unit 802 for receiving an object transmitted by the source device;

A display unit 803 for displaying the to-be-transmitted object information into a specified region on a local display screen, the specified region being a region on the local display screen to which the source device projects the to-be-transmitted object information through a projecting unit.

Wherein, the receiving unit 802 may include:

A receiving module for receiving the to-be-transmitted object information transmitted by the source device, a projection display parameter of the to-be-transmitted object information and a display effect, the display effect being obtained by collecting after the source device projects the to-be-transmitted object information to the specified region on the local display screen;

Correspondingly, the above target device may also include:

A correcting unit for collecting current display effect of the local display screen and correcting the received display effect according to the current display effect of the local display screen;

The display unit is for: displaying the to-be-transmitted object information in the specified region on the local display screen according to the corrected display effect and the projection display parameter of the to-be-transmitted object information.

Further, the above correcting unit may include:

A collecting module for intercepting a picture displayed currently on the local display screen to obtain the current display effect of the local display screen.

In the present embodiment, the above correcting unit may include:

A correcting module for comparing parts of same content in the current display effect of the local display screen and the received display effect;

Calculating a correcting parameter of the part of the same content from the received display effect to the current display effect of the local display screen;

Correcting the received display effect according to the correction parameter.

In the present embodiment, the above projection display parameter of the to-be-transmitted object information may include the screenshot of the projection picture of the to-be-transmitted object information, correspondingly, the above display unit may be for:

Calculating to obtain size and angle corresponding to the to-be-transmitted object information according to the screenshot of the projection picture of the to-be-transmitted object information;

Displaying the to-be-transmitted object information into the specified region on the local display screen according to the size and the angle of the object calculated to be obtained with the corrected display effect as target.

The above-described target device provided by the present embodiment may execute method provided in the above-described method embodiment, detailed procedure is as description in the method embodiment, and it is no longer described here.

In the above-described target device provided by the present embodiment, by establishing the connection with the source device, receiving the to-be-transmitted object information transmitted by the source device, displaying the to-be-transmitted object information in the specified region on the local display screen, the specified region being the region on the local display screen to which the source device projects the to-be-transmitted object information through the projecting unit, the transmission of the to-be-transmitted object information between device are implemented based on the projection, which achieves the seamless operational experience combining the actual condition and the virtual condition, and the manner of projection is simple and convenient and intuitive and high effective, which improves the features of real-time and easy to use of transmitting the object.

Those skilled in the art can understand that, all or a part of steps for implementing the above method can be completed by hardware, and can also be completed by a program instructing the related hardware, the program can be stored in a computer readable storage medium including a read-only memory, a disk or an optical disk or the like.

The above mentioned is only preferred embodiment of this disclosure and did not limit this disclosure, any of the modification, equivalent replacement, improvement or the like within the spirit and principle of this disclosure should be included in the range sought for protection by this disclosure.

The invention claimed is:

1. An information transmitting method comprising:
    establishing a communication connection with an electronic device;
    selecting a to-be-transmitted object that is a file;
    projecting an image of the to-be-transmitted object into a display screen of the electronic device; and
    transmitting data of the to-be-transmitted object to the electronic device;
    stopping projecting of the image of the to-be-transmitted object after transmitting the data of the to-be-transmitted object to the electronic device to make the electronic device actually display the image of the to-be-transmitted object in the display screen based on the data of the to-be-transmitted object,
    wherein the transmitting the data of the to-be-transmitted object to the electronic device to make the electronic device display the image of the to-be-transmitted object in the display screen comprises:
        acquiring a projection display parameter of the image of the to-be-transmitted object and collecting a display effect on the display screen of the electronic device;
        transmitting the data of the to-be-transmitted object, the projection display parameter of the to-be-transmitted object, and the display effect to the electronic device, to make the electronic device display the image of the to-be-transmitted object with the display effect in a specified region on the display screen according to the projection display parameter.

2. The method according to claim 1, wherein the acquiring the projection display parameter of the image of the to-be-transmitted object information comprises acquiring a screenshot of a projection picture of the image of the to-be-transmitted object as the projection display parameter of the to-be-transmitted object.

3. The method according to claim 1, wherein the projecting the image of the to-be-transmitted object into the display screen of the electronic device comprises:
    adjusting a size of the image of the to-be-transmitted object on a local display screen according to a local operation instruction;
    projecting the image of the to-be-transmitted object displayed on the local display screen after the adjusting size of the image of the to-be-transmitted object into a specified region on the display screen of the electronic device; and
    wherein the acquiring the projection display parameter of the to-be-transmitted object comprises acquiring a screenshot of a projection picture of to-be-transmitted object displayed on the local display screen after the adjusting the size of the image of the to-be-transmitted object as the projection display parameter of the image of the to-be-transmitted object.

4. The method according to claim 1, wherein the collecting the display effect on the display screen of the electronic device comprises intercepting a picture of the display screen of the electronic device to obtain the display effect on the display screen of the electronic device.

5. The method according to claim 1, wherein the collecting the information of the electronic device comprises collecting a picture of the electronic device or scanning a two-dimensional code on the electronic device.

6. A first electronic device comprising:
    a connection unit for establishing a communication connection with a second electronic device;
    a selecting unit for selecting a to-be-transmitted object that is a file;
    a projecting unit for projecting an image of the to-be-transmitted object into a display screen of the second electronic device; and
    a transmitting unit for transmitting data of the to-be-transmitted object to the second electronic device,
    wherein the projecting unit stops projecting the image of the to-be-transmitted object after the transmitting unit has transmitted the data of the to-be-transmitted object to the second electronic device to make the second electronic device actually display the image of the to-be-transmitted object in the display screen based on the data of the to-be-transmitted object,
    wherein the transmitting unit comprises:
        an acquiring module for acquiring a projection display parameter of the image of the to-be-transmitted object and collecting a display effect on the display screen of the second electronic device; and
        a transmitting module for transmitting the data of the to-be-transmitted object, the projection display parameter of the to-be-transmitted object and the display effect to the second electronic device, to make the second electronic device display the image of the to-be-transmitted object with the display effect in a specified region on the display screen according to the projection display parameter.

7. The first electronic device according to claim 6, wherein the acquiring module acquires a screenshot of a projection picture of the to-be-transmitted object as the projection display parameter of the to-be-transmitted object.

8. The first electronic device according to claim 6, wherein, the projecting unit comprises:
    an adjusting module for adjusting size of the image of the to-be-transmitted object on a local display screen according to a local operation instruction; and
    a projecting module for projecting the image of the to-be-transmitted object displayed on the local display screen after the adjusting of the size of the image of the to-be-transmitted object into a specified region on the display screen of the second electronic device;
    wherein the acquiring module acquires a screenshot of a projection picture of to-be-transmitted object displayed on the local display screen after the adjusting of the size of the image of the to-be-transmitted object as the projection display parameter of the to-be-transmitted object.

9. The first electronic device according to claim 6, wherein the acquiring module intercepts a picture of the display screen of the second electronic device to obtain the display effect on the display screen of the second electronic device.

10. The first electronic device according to claim 6, wherein the collecting module collects a picture of the second electronic device or scans a two-dimensional code on the second electronic device.

11. The method according to claim 1, wherein, establishing the communication connection with the electronic device comprises:
- collecting information of the electronic device;
- searching correspondence relationship between the information of the electronic device and address established in advance to obtain an address corresponding to the information of the electronic device collected; and
- establishing the communication connection with the electronic device according to the address.

12. The first electronic device according to claim 6, wherein, the connecting unit comprises:
- a collecting module for collecting information of the second electronic device;
- a search module for searching correspondence relationship between the information of the second electronic device and address established in advance to obtain an address corresponding to the information of the second electronic device collected;
- a connecting module for establishing the communication connection with the second electronic device according to the address.

* * * * *